W. N. SPRINGER.
RAISING AND LOWERING MEANS FOR GANG PLOW UNITS.
APPLICATION FILED JUNE 18, 1913.
1,095,531.
Patented May 5, 1914.
2 SHEETS—SHEET 1.
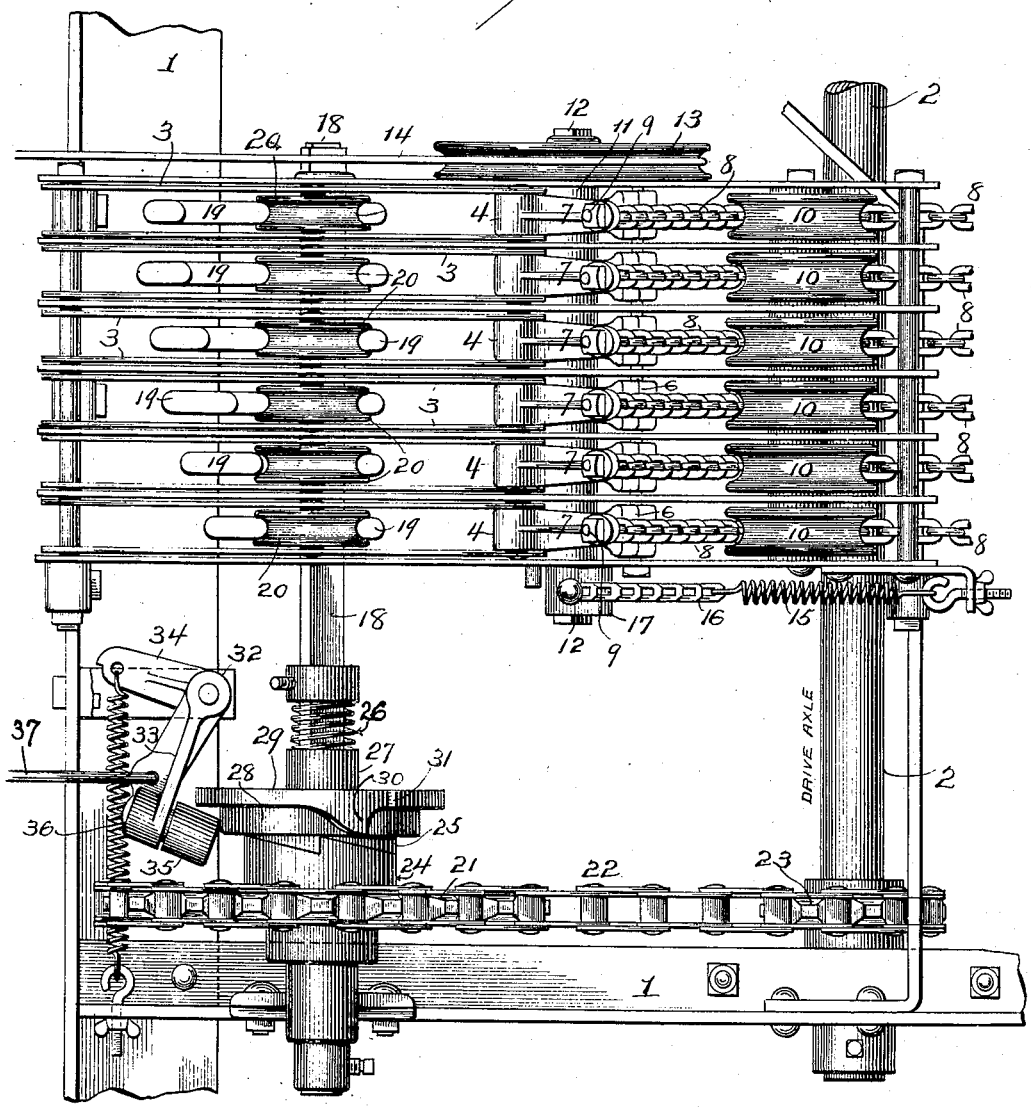

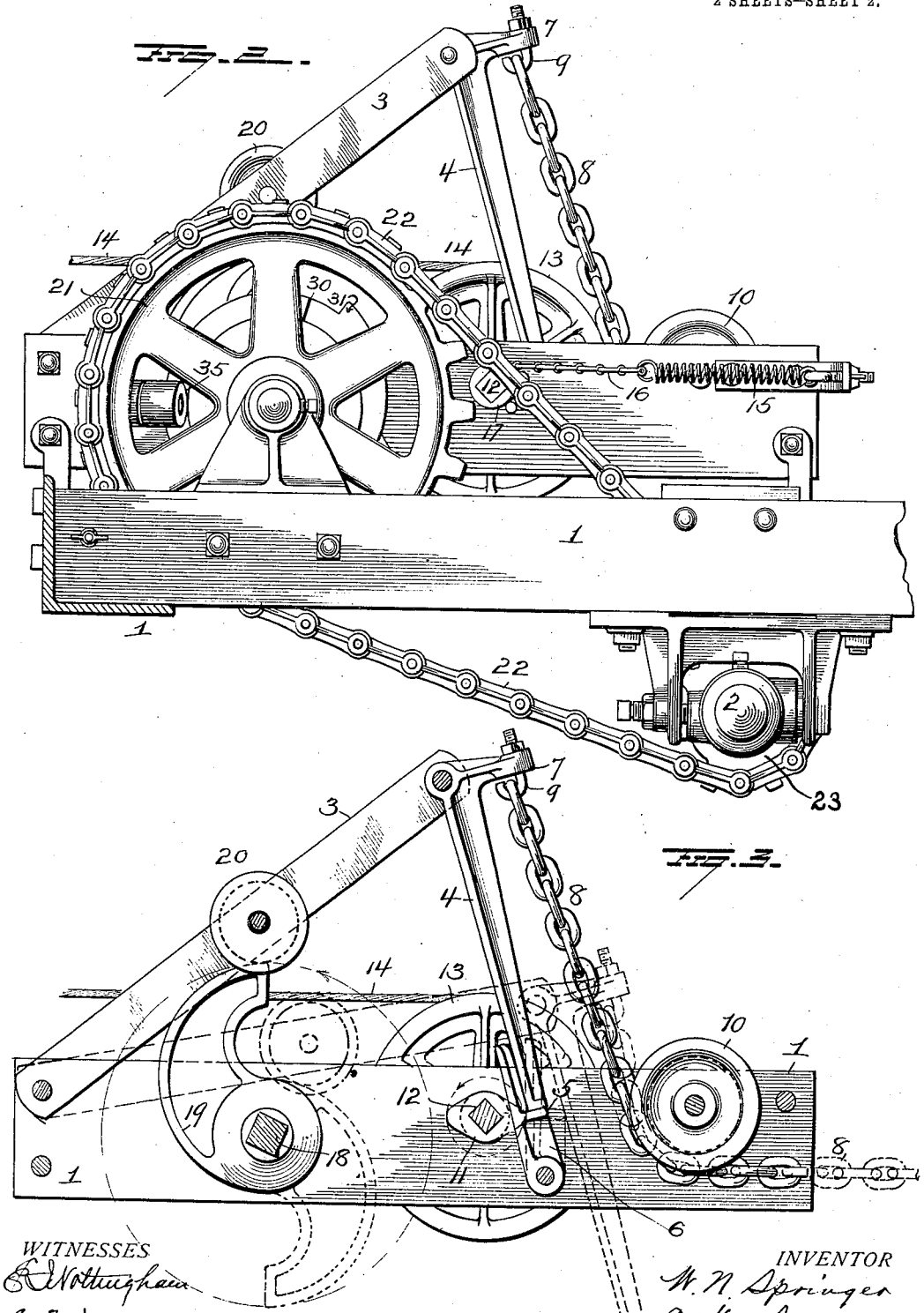

UNITED STATES PATENT OFFICE.

WILLIAM N. SPRINGER, OF SOUTH BEND, INDIANA, ASSIGNOR TO OLIVER CHILLED PLOW WORKS, OF SOUTH BEND, INDIANA.

RAISING AND LOWERING MEANS FOR GANG-PLOW UNITS.

1,095,531. Specification of Letters Patent. Patented May 5, 1914.

Application filed June 18, 1913. Serial No. 774,446.

*To all whom it may concern:*

Be it known that I, WILLIAM N. SPRINGER, of South Bend, in the county of St. Joseph and State of Indiana, have invented certain new and useful Improvements in Raising and Lowering Means for Gang-Plow Units; and I do hereby declare the following to be a full, clear, and exact description of the invention, such as will enable others skilled in the art to which it appertains to make and use the same.

This invention relates to improvements in engine gang plow structures, and more particularly to power lift mechanism for effecting the successive raising and lowering of the several plow units,—the object of the invention being to provide a simple and compact mechanism which may be readily controlled for raising the plow units, one after another, and for dropping said plow units successively.

A further object is to provide simple and efficient means for retaining the plow units in raised position, and for tripping such retaining means to permit the plow units to descend to working position.

With these and other objects in view, the invention consists in certain novel features of construction and combinations of parts as hereinafter set forth and pointed out in the claims.

In the accompanying drawings; Figure 1 is a plan view showing a portion of the frame of an engine gang plow structure and illustrating an embodiment of my improvements; Fig. 2 is a side elevation, with portions of the frame in section, and Fig. 3 is a sectional view showing the devices for operating one of the plow units, in elevation.

1 represents a portion of the frame for an engine gang plow, with which the plow units may be connected in any approved manner, and 2 illustrates a drive axle having suitable bearings secured to said frame.

Lifting levers 3, corresponding in number with the number of plow units employed, are arranged side by side, but spaced short distances apart, and each of these levers is pivotally connected at one end with the frame 1. An arm 4 is pivotally attached at its upper end to each lever 3 and depends therefrom so as to be capable of engaging a flange or shoulder 5 on a trip arm 6, pivotally connected with the frame,—it being of course understood that a trip arm 6 is provided for each depending arm 4. Each arm 4 is provided at its upper pivoted end with a projection 7, with which one end of a chain 8 is connected by means of an adjustable hook 9. Each chain 8 extends downwardly from its connection with one of the arms 4 and after passing under a pulley 10, is extended rearwardly for connection with suitable lifting means on a plow unit.

When a plow unit is in elevated position the parts will assume the positions shown in Fig. 3, with the prop arm 4 resting upon the flange 5 of a trip arm 6. The force exerted by the chains 8 will tend to press the arms 4 against the trip arms 6 and retain the latter in contact with cams 11 which are secured to a shaft 12 mounted in suitable bearings in the frame 1,—said cams thus serving as abutments for the trip arms to retain the latter in proper position to sustain the prop arms when the levers 3 are elevated. The cams 11 are spirally arranged so that when the shaft 12 is turned, they will operate the trip arms 6 successively to release the prop arms 4 and thus permit the successive dropping of the levers 3 and also the plow units to be lowered to working position, one after another. Any suitable means may be provided for rotating the cam shaft 12. For example, said shaft may be provided with a grooved wheel 13 to receive an operating rope or cable 14. The cam shaft may be retained in and returned to normal position by the action of a spring 15, one end of which is connected with the frame 1 and the other end is connected with the shaft 12 through the medium of a chain 16, secured to and adapted to wind on a hub 17 on said shaft.

For effecting the operation of the levers 3 to raise the plow units successively, the devices now to be described are employed: A shaft 18 is located under the levers 3 and mounted in suitable bearings on the frame 1. The shaft 18 carries a plurality of cams 19 to coöperate with rollers 20 mounted on the levers 3 between the ends of the latter, said cams being so arranged on the shaft that when the latter is rotated, the levers 3 will be elevated successively to cause the successive raising of the plow units.

A large sprocket wheel 21 is mounted loosely on the shaft 18 and receives motion, through the medium of a sprocket chain 22, from a smaller sprocket wheel 23 secured to the drive axle. The larger sprocket wheel 21 is provided with a clutch member 24, to cooperate with a clutch member 25 mounted to rotate with but slidable on the shaft 18. A spring 26 encircles the shaft and bears against a collar 27 secured to the shaft,—said spring tending to force the clutch member 25 into mesh with the clutch member 24. The clutch member 25 is made with an annular enlargement 28 and with an annular flange 29, the latter being provided with a lateral cam 30 projecting over the peripheral face of the enlargement 28, and with a peripheral tooth 31 near the cam 30. An L-shaped lever 32 is pivotally attached at the juncture of its two arms 33—34 to the frame 1. The arm 33 of this lever carries a roller 35, and a spring 36 fixed at one end and attached at its other end to the arm 34, serves to normally press the roller 25 toward the clutch. Under normal conditions, the roller 31 will be disposed against the side face of the enlargement 28 so as to retain the clutch member 25 out of mesh with the clutch member 24. When the lever 32 is withdrawn (which withdrawing may be accomplished with the use of a suitable rod 37), the clutch member 25 will be pressed, by the spring 26, into mesh with the loose clutch member 24, and the spring 36 will then press the roller against the peripheral face of the enlargement 28 on clutch member 25. Motion will now be transmitted from the drive axle 2, through the sprocket gearing and clutch to the shaft 18, thus causing the operation of the cams 19 to raise the lifting levers 3 successively, and permit the prop arms 4 to drop onto the flanges 5 of the trip arms 6 to retain said raising levers elevated. When the shaft 18 shall have turned sufficiently to effect the raising of all the levers 4 and the plow units connected therewith, the lateral cam 30 of the clutch member 25 will engage the roller 35 and cause the withdrawal of the clutch member 25 from the clutch member 24, whereupon the roller 35 will drop alongside the annular enlargement 28 and the tooth 31 will engage the arm 33 of lever 32 to prevent further rotation of the cam shaft 18, so that when the several levers 3 shall have been operated, the rotation of the shaft will be stopped with all of the cams out of line with the said levers 3. The levers 3 and the plow units with which they are connected, may now be dropped successively by operating the trip arms as hereinbefore described.

I do not in this application claim specifically the stop mechanism herein shown and described, the same constituting a separate subject-matter of invention.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In raising and lowering mechanism for gang plow units, the combination with a frame, of levers pivoted thereto, cams for raising said levers successively, means for operating said cams, arms pivoted to and depending from said levers, lifting chains connected with said arms, trip levers to receive the lower ends of said arms, and means for tripping said trip levers successively.

2. In raising and lowering means for gang plow units, the combination with a frame, of levers each pivoted near one end thereto, cams for raising said levers successively, means for operating said cams, prop arms pivotally connected thereto and depending therefrom, each of said prop arms having a projection at its upper end, lifting chains connected with the projections of said prop arms, pulleys mounted in the frame and under which said chains pass, trip levers for said prop arms, and means for tripping said trip levers successively to release the prop arms.

3. In raising and lowering means for gang plow units, the combination with a frame, and a drive axle, a plurality of levers pivoted thereto, a shaft under said levers, cams carried by said shaft for raising said levers successively, prop arms pivoted to said levers, lifting chains connected with said prop arms, gearing connecting the drive axle and said shaft, a clutch for operatively connecting the gearing with said shaft, means for operating said clutch, trip levers for the prop arms, and means for operating said trip levers successively to release the prop arms.

4. In raising and lowering means for gang plow units, the combination with a frame, of a plurality of levers, means for raising said levers successively, prop arms pivoted to said levers and having projections at their upper ends, a plurality of trip levers having supports below their upper ends to receive said prop arms, a shaft adjacent to said trip levers, cams on said shaft constituting abutments for said trip levers and arranged to trip said trip levers successively to remove the prop arms from the supports thereon, means for operating said shaft, lifting chains connected with the projections of said prop levers, and pulleys on the frame, under which the lifting chains pass.

5. In raising and lowering means for engine plow units, the combination with a frame, of a plurality of levers, means for raising said levers successively, props pivoted to said levers and having projections at their upper ends, lifting chains connected with the projections of the props, trip levers to receive said props, a shaft adjacent to said trip levers, cams on said shaft arranged to trip the trip levers successively to release the props, means for manually rotating said shaft in one direction, a chain connected with said shaft and a spring connected with said chain for rotating said shaft in the reverse direction.

In testimony whereof, I have signed this specification in the presence of two subscribing witnesses.

WILLIAM N. SPRINGER.

Witnesses:
 EDWIN NICAR,
 KATE BUCKLEY.